Fig. 1.

Complex Of Zinc Bithionolate And Ethylenediamine

Fig. 2.

Complex Of Zinc Dithionolate And Dimethylamine

FIG. 3.

COMPLEX OF ZINC BITHIOMOLATE AND DIETHYLAMINE

Fig. 5.  Mono(Ethylenediamine) Complex Of Mono-Zinc Hexachlorophene

Fig. 6.

Bis(Ethylenediamine) Complex Of Mono-Zinc Hexachlorophene

Fig. 7.

Tris(Ethylenediamine) Complex Of Mono-Zinc Hexachlorodrene

Fig. 8.

Bis(Ethylenediamine) Complex Of Di-Zinc Hexachlorophene

United States Patent Office 3,426,024
Patented Feb. 4, 1969

---

3,426,024
AMINE COMPLEXES OF ZINC SALTS OF CHLORINATED THIOBISPHENOLS
Allan M. Harvey, Wilton, Conn., assignor to R. T. Vanderbilt Co., Inc., New York, N.Y., a corporation of New York
Continuation-in-part of application Ser. No. 439,395, Mar. 12, 1965. This application Nov. 17, 1967, Ser. No. 689,217
U.S. Cl. 260—270                    26 Claims
Int. Cl. C07d 29/34, 29/16; C07f 3/06

ABSTRACT OF THE DISCLOSURE

Amine complexes of zinc salts of certain chlorinated bisphenols, such as the mono(ethylenediamine) complex of the mono-zinc salt of hexachlorophene, are useful as bacteriostatic agents, especially in combination with fabric softeners and soaps. The complexes may be produced by reaction of stoichiometric amounts of zinc oxide, a bisphenol and an amine; by reaction of stoichiometric amounts of an amine, zinc sulfate and a sodium salt of a bisphenol; or by reaction of excess amine with a zinc salt of a bisphenol.

---

This application is a continuation-in-part of application Ser. No. 439,395 filed Mar. 12, 1965 and now abandoned.

This invention relates to a new class of compounds, specifically to amine complexes of zinc salts of certain 2,2′-bis(chlorinated phenols), and also relates to mixtures of such compounds with fabric softeners and soaps.

The increasing use in recent decades of various antibiotics has been countered in nature by the emergence of anti-biotic-resistant strains of bacteria, especially staphylococci. Consequently there is an increased need to maintain higher standards of human sanitation in hospitals, homes and personal hygiene. New bacteriological effective compounds are constantly being sought for such purposes. The search is difficult because of the unpredictability of the bacteriological and compatibility characteristics of chemical compounds.

Although improved sanitation over a wide spectrum of human activities reduces the incidence of bacterial and fungicidal infection, it becomes a significant burden if it requires new procedures or processing steps in addition to those already in common usage. It is clearly advantageous to incorporate wherever possible into substances and/or procedures now commonly used in everyday life appropriate compounds which kill or inhibit the growth of bacteria and fungi. Accordingly such compounds need to be compatible with whatever other cleansing agent or substance with which they are used, as well as being bacteriologically effective.

In view of the foregoing, it is an object of this invention to provide improved bacteriological agents.

It is a further object to provide laundry materials incorporating improved bacteriological agents.

It is an additional object to provide fabric softeners having bactericidally-effective amounts of such bacteriological agents.

A still further object is to provide a process of sanitizing fabric using dilute solutions of such agents.

Briefly stated, the present invention is based upon the discovery of a new class of compounds, the amine complexes of zinc salts of 2,2′-bisphenols of the formula:

$$(X)_nZn \cdot Y \qquad (I)$$

wherein X represents a monovalent or divalent residue of a bisphenol, as hereinafter defined, formed by the removal of at least one of the hydrogens of the hydroxyls of said bisphenol; $n$ is an integer having a value of 1 or 2; and Y represents the complexed amine moiety or moieties sufficient to provide an atomic ratio of amino nitrogen to zinc of at least 1:1 and preferably at least 2:1.

The bisphenols which form the bisphenol residues of Formula I are chlorinated 2,2′-thiobisphenols or 2,2′-methylene-bisphenols of the formula:

wherein A is thio or methylene, and $x$ is an integer having a value of from 0 to 3, preferably 1 or 2. Illustrative phenols include 2,2′-thiobis(4-chlorophenol), 2,2′-thiobis(4,6-dichlorophenol) (bithionol), 2,2′-methylene-bis(4-chlorophenol), 2,2′-methylenebis(3,4,6-trichlorophenol) (hexachlorophene), and the like.

The zinc salts which form the portion of the complexes of this invention represented by $(X)_nZn$ include both the "monozinc" and the "di-zinc" salts, i.e., salts in which the ratio of gram atoms of zinc to gram equivalents of bisphenol residue is either 1:2 or 1:1.

Preferred mono-zinc salts are those of the 2,2′-methylene-bisphenols, which may be illustrated by the formula:

wherein X is as defined above, of which the mono-zinc salt of hexachlorophene is particularly preferred.

Preferred di-zinc salts are those of the 2,2′-thiobisphenols, which may be illustrated by the formula:

wherein $x$ is as defined above, with the di-zinc salt of bithionol being particularly preferred.

Amines which may form the amine moiety of the complexes are those which do not adversely affect the bactericidal activity of the zinc salt, and include primary, secondary or tertiary monoor polyamines wherein each amino nitrogen is bonded to at least one hydrocarbon radical, which may comprise one or more saturated or unsaturated aliphatic, cycloaliphatic or aromatic moieties, and wherein the amino nitrogen may be contained in a heterocyclic moiety. Desirably, the amine should contain no more than about 40 carbons and 4 amino nitrogens, and preferably no more than about 12 carbons and 2 amino nitrogens. Heterocyclic amines should have no more than one heterocyclic nitrogen atom.

Particularly preferred amines are those of the formulae:

(V)

(VI)

wherein $y$ is an integer having a value of 0 or 1; each of R, $R^1$, $R^2$, and $R^3$, when taken alone, is hydrogen or a hydrocarbyl radical free of aliphatic, i.e., olefinic or acetylenic, unsaturation, with the proviso that when $y$ is 0, R is hydrocarbyl; $R^4$ is a hydrocarbylene radical free of aliphatic unsaturation; $z$ is an integer having a value of 0 or 1; $R^5$ is hydrogen or a lower alkyl; and $R^6$ is a hydrocarbon radical which, when taken with N, forms a six-membered heterocyclic saturated or unsaturated ring system.

A desirable subclass of the amines within the scope of Formula V is that comprising the amines wherein the hydrocarbyl radicals are lower alkyl and the hydrocarbylene radical is a lower $\alpha,\beta$-alkylene radical, i.e., a lower alkylene radical whose valence bonds are from adjacent carbons.

A desirable subclass of heterocyclic amines within the scope of Formula VI are those wherein the heterocyclic moiety is unsubstituted, or is substituted on one or more carbons thereof with saturated hydrocarbyl groups, especially alkyl groups, or is fused to one six-membered carbocyclic ring, such as pyridine, piperidine and iso-quinoline, as well as alkyl-substituted derivatives thereof.

By the term "hydrocarbyl radical free from aliphatic unsaturation" is meant a monovalent hydrocarbon radical comprising saturated aliphatic or cycloaliphatic moieties or aromatic moieties, such as alkyl, cycloalkyl, aryl, aralkyl, alkaryl and the like, and having up to about 10, and preferably up to about 3 carbons. By the term "hydrocarbylene radical free from aliphatic unsaturation" is meant a divalent hydrocarbon radical comprising saturated aliphatic or cycloaliphatic moieties or aromatic moieties, such as alkylene, arylene and the like, whose valence bonds are from different carbons and which go up to about 10 carbons and preferably up to about 3 carbons.

Illustrative amines include ethylamine, isopropylamine, 4 - methyl-2-pentylamine, dimethylamine, diethylamine, ethylpropylamine, trimethylamine, dimethylethylamine, ethylenediamine, 1,2-propanediamine, 1,4-butanediamine, 1,3-hexanediamine, N-methyl-1,3-propanediamine, cyclohexylamine, p-phenylenediamine, aniline, 3,4 - dichloroaniline, ethanolamine, N-(3 - aminopropyl)cyclohexylamine, distearylamine, pyridine, piperidine, isoquinoline and the like. Ethylenediamine is especially preferred.

The precise structures of the products of this invention are not definitely established, but the fact that they are complexes is established by their infrared spectra. Thus, the spectra of the products of this invention are different from those of the reactants or other possible products such as the bisphenols, the amines, or the zinc or amine salts of the bisphenols. In these complexes, a nitrogen of the amine moiety is associated with the zinc of the zinc-bisphenol salt. The number of amine moieties and the nitrogen-zinc ratio present in the complex of this invention will vary, depending upon the particular amine and zinc salt employed. In the case of complexes of the mono-zinc salts, such as those of Formula III, when excess amine over that required for complex formation is present, the excess amine can form a salt at the sites of the free hydroxyls.

Preferred classes of amine complexes are:

(A) The amine complexes of di-zinc bithionol wherein the amine is of Formula V, above, especially ethylenediamine, and the gram atomic ratio of amine nitrogen to zinc is 2:1;

(B) The amine complexes of di-zinc bithionol wherein the amine is a heterocyclic amine of Formula VI, above, especially piperidine or pyridine, and the gram atomic ratio of amine nitrogen to zinc is 1:1; and (C) The amine complexes of the mono-zinc salt of hexachlorophene wherein the amine is as defined by Formula V, above, especially ethylenediamine, and the gram atomic ratio of nitrogen to zinc is from 2:1 to 6:1, preferably 2:1 to 4:1.

The complexes of this invention are white, powdery, crystalline solids having rather high (above 150° C., and generally above 200° C.) melting points, and have a tendency to decompose at elevated temperatures, sometimes at about their melting points.

Such amine complexes preferably are made by reacting zinc oxide, a bisphenol and an amine in stoichiometric amounts. The reaction is usually conducted in a reaction diluent, such as water or ethanol.

After the reactants have been mixed, the reaction mixture is preferably heated to an elevated temperature, about 90°–100° C., and held at that temperature with stirring for a period of about one-fourth to about three hours, preferably about one hour. The reaction mixture is then cooled, filtered and the product washed and dried. The drying is preferably under a vacuum at relatively low temperatures.

An alternative method of preparation uses zinc sulfate and a sodium salt of the bisphenol. In this method, a stoichiometric amount of the amine is added to the sodium salt dissolved in a very dilute aqueous sodium hydroxide solution. Addition of the amine is followed by the slow addition of an aqueous solution containing a stoichiometric amount of zinc sulfate. The resulting slurry is allowed to react at room temperature with extended stirring, and the product separated by filtration, water-washed and dried as aforesaid.

In a third method, an excess of an amine may be added to an aqueous slurry of the zinc-bisphenol salt, and the mixture refluxed with stirring for about an hour. The product complex is recovered by filtering, water-washing and drying under vacuum.

The following specific examples will further characterize a number of the new amine complexes of this invention.

Example I

The first example illustrates the preparation of the ethylenediamine complex of di-zinc bithionolate starting with zinc oxide and bithionol. This method is preferred, because, of the three methods of preparation referred to above, it yields the purest product.

To a mixture of 17.8 grams (0.05 mole) of bithionol (2,2'-thiobis[4,6-dichlorophenol]) and 4.05 grams (0.05 mole) of zinc oxide suspended in 250 ml. of water in a 500 ml. flask equipped with stirrer, condenser and dropping funnel, there was added at about 20° C. 3.0 grams (0.05 mole) of ethylenediamine with stirring over a period of five minutes. The resulting slurry was heated slowly to 96° C. and stirred at that temperature for 30 minutes. The slurry was then cooled to 15° C. and the white solids were filtered, washed with water, and dried in a vacuum oven at 60° C. A yield of 23.7 grams (99% of theoretical) of fine, white powder was obtained. The compound melted with decomposition in the range of 300–320° C. Elemental analysis of the complex showed its composition to be, with the theoretical percentages of the elements in parentheses: carbon, 33.22 weight percent (35.07%); hydrogen, 2.71% (2.52%); chlorine, 28.73% (29.58%) and zinc, 13.60% (13.63%).

Figure 1:
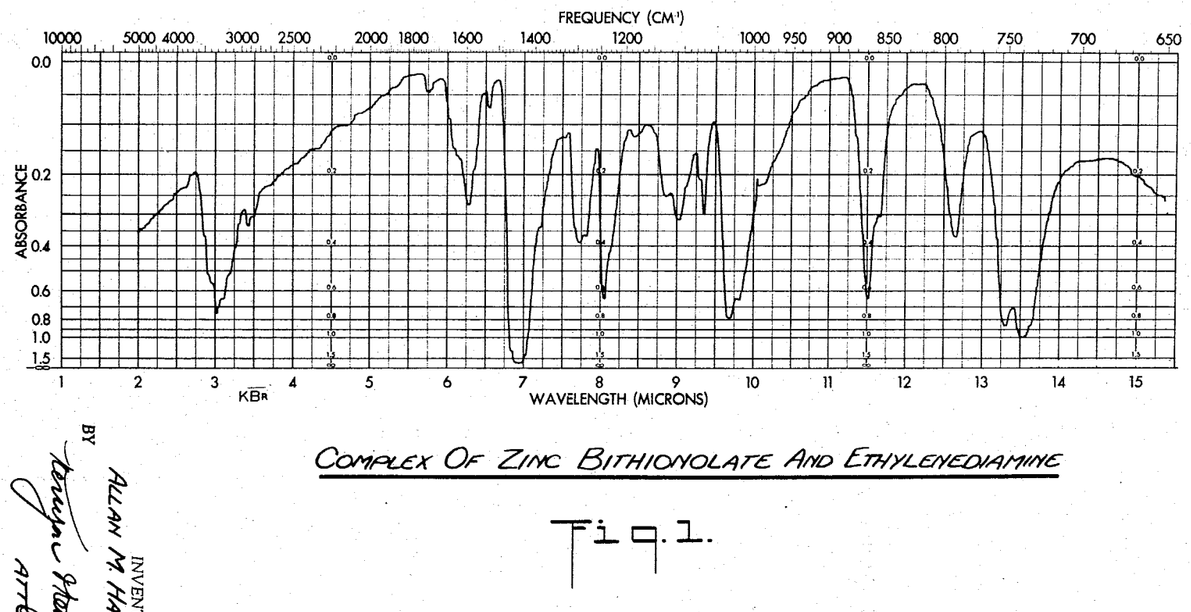

An infrared spectrum of the ethylenediamine complex prepared in Example I is shown in FIGURE 1. This spectrum and the spectra referred to in subsequent examples were taken in KBr medium using a Perkin-Elmer double beam infrared spectrophotometer.

Example II

The second example illustrates the preparation of the ethylenediamine complex of Example I by the method of adding an aqueous solution containing zinc sulfate to a solution of sodium bithionolate and ethylenediamine.

Eighty grams (0.2 mole) of sodium bithionolate were dissolved in 800 ml. of water containing 2.0 grams of sodium hydroxide. To the clear solution thus formed was added 12 grams (0.2 mole) of ethylenediamine, followed by dropwise addition of 57.6 grams (0.2 mole) of zinc sulfate heptahydrate (ZnSO$_4$.7H$_2$O), dissolved in 300 ml. of water. The resulting white slurry was stirred for an hour, filtered, and the filter cake washed well with water and dried in a vacuum oven at 60° C. A yield of 96 grams (100% of theoretical) of white solids was obtained. Infrared analysis showed this product to be identical with the product of Example I except for trace amounts of impurities.

Example III

The third example illustrates the preparation of the ethylenediamine complex starting with di-zinc bithionolate.

To a slurry of 17.3 grams of di-zinc bithionolate, (0.041 mole) in 100 ml. of water, there was added 3.0 grams (0.05 mole) of ethylenediamine. The mixture was refluxed with stirring in a 500 ml. flask equipped with stirrer and reflux condenser. After refluxing for 1½ hours, the slurry was cooled to 15° C. and filtered. The wet cake was washed with water and dried at 55° C. in a vacuum oven. A yield of 18.2 grams (94.3% of theoretical of white solids was obtained which melted with decomposition in the range of 315–320° C. The infrared spectrum of this material was identical with that of Example I except for trace amounts of impurities.

Example IV

A complex of di-zinc bithionolate and 1,3-propanediamine was made by the zinc oxide method.

A slurry of 8.1 grams (0.1 mole) of zinc oxide, 7.4 grams (0.1 mole) of 1,3-propanediamine and 200 ml. of water was prepared in a 500 ml. flask equipped with stirrer, reflux condenser, and dropping funnel. To this was added 35.6 grams (0.1 mole) of bithionol slurried in 100 ml. of water. While stirring, the mixture was heated slowly to 95° C. and held at this temperature for 90 minutes. The resulting slurry was cooled and filtered, and the cake washed with water and dried at 65° C. A pure white powder was obtained in 49.2 gram yield (100% of theoretical) having a melting point in the range of 240–265° C.

Example V

A complex of 1,2-propanediamine was made in which the method of Example IV was followed, substituting 7.4 grams (0.1 mole) of 1,2-propanediamine for the 1,3-propanediamine. A pure white powder was obtained in 48.4 grams yield (98.4% of theoretical) which did not melt below 330° C.

Example VI

The di-zinc bithionolate-dimethylamine complex was made using the zinc oxide method.

Figure 2:
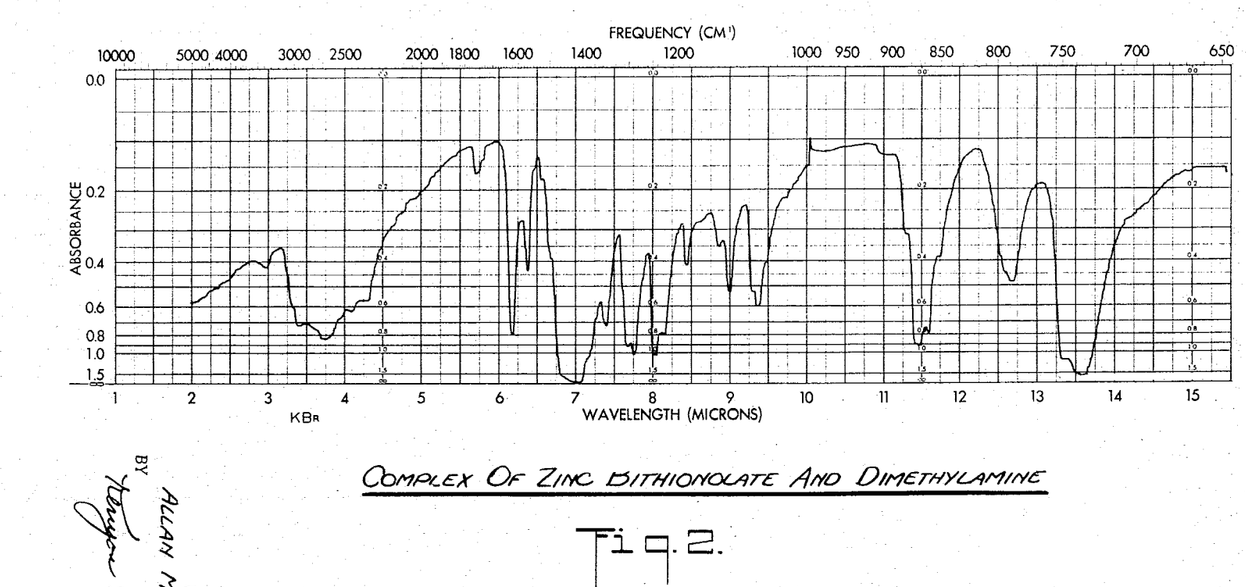

A mixture of 35.6 grams (0.1 mole) of bithionol, 8.1 grams (0.1 mole) of zinc oxide, 23 grams of 40% dimethylamine solution (0.2 mole) and 150 ml. of water was heated to 90° C. with stirring in the apparatus used in Example III. The mixture was held at 90° C. for 2 hours, then cooled to 15° C. and the solids were filtered, washed with water, and dried in a vacuum oven at 50° C. White solids were obtained in 49.0 gram yield (96.3% of theoretical) having a melting point of 200° C. (with decomposition). An infrared spectrum of the dimethylamine complex so prepared is shown in FIGURE 2.

Example VII

The di-zinc-bithionolate-diethylamine complex was also made by the zinc oxide method.

The procedure of Example VI was followed, substituting 14.6 grams (0.2 mole) of diethylamine for the dimethylamine solution, and carrying out the reaction at 95° C. for two hours. White solids were obtained in 48.0 gram yield (85% of theoretical) having a melting point of 160° C. (with decomposition). An infrared spectrum of the diethylamine complex so prepared is shown in FIGURE 3.

Example VIII

The triethylamine-di-zinc bithionolate complex was prepared as follows:

A mixture of 35.6 grams of bithionol, 8.1 grams of zinc oxide, 20.2 grams of triethylamine, and 150 ml. of water was heated and stirred in a 500 ml., 3-necked flask equipped with a reflux condenser, thermometer and stirrer for 3 hours at 65–75° C. The resulting white slurry was cooled to 25° C. and the solids recovered by filtration, washing and drying. A yield of 52.6 grams (84.7% of theoretical) of fine white powder melting at 235–245° C. was obtained.

Example IX

Figure 4:
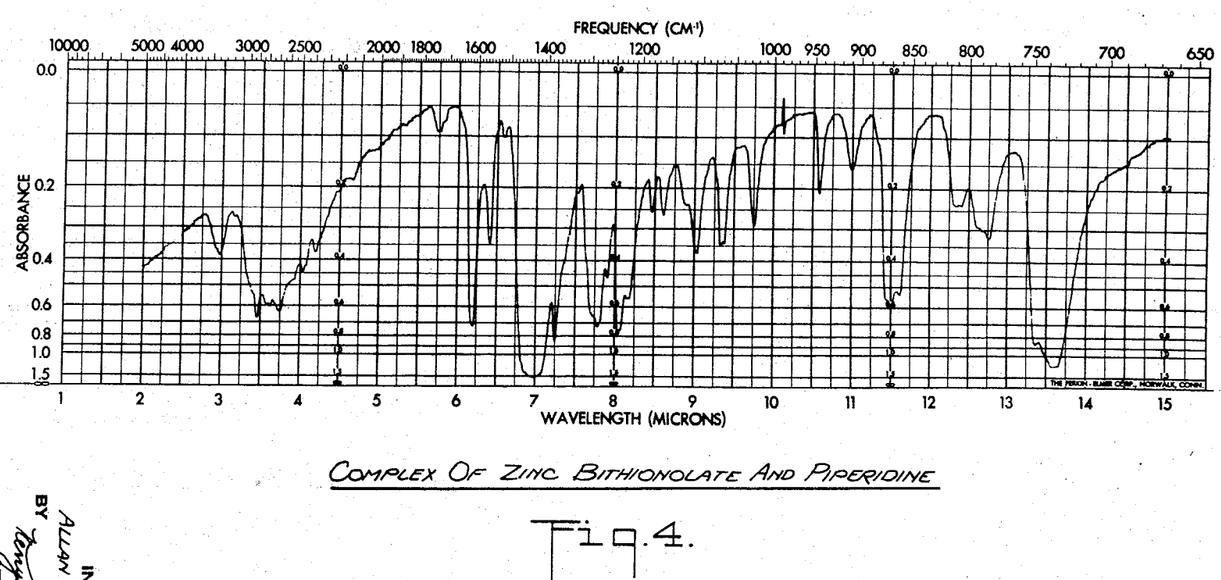

The mono-piperidine complex of di-zinc bithionolate was prepared as follows:

To a slurry of 17.8 grams (0.05 mole) of bithionol and 0.04 grams (0.05 mole) of zinc oxide was added 8.5 grams (0.10 mole) of piperidine. The mixture was heated and stirred at 95° C. for 1.5 hours, then cooled to 10° C. and the solids filtered, washed with water, and dried at 55° C. to yield 25.3 grams of white product. The infrared spectrum of the produce, which is shown in FIGURE 4, shows a medium absorption band at 10.95 which was not present in spectra for bithionol, zinc bithionolate, piperidine, or the piperidine salt of bithionol. The product did not melt below 300° C. Yield data and analysis of the filtrate from this preparation indicates that only one mole of piperidine complexed with one mole of zinc bithionolate.

Example X

Figure 5:
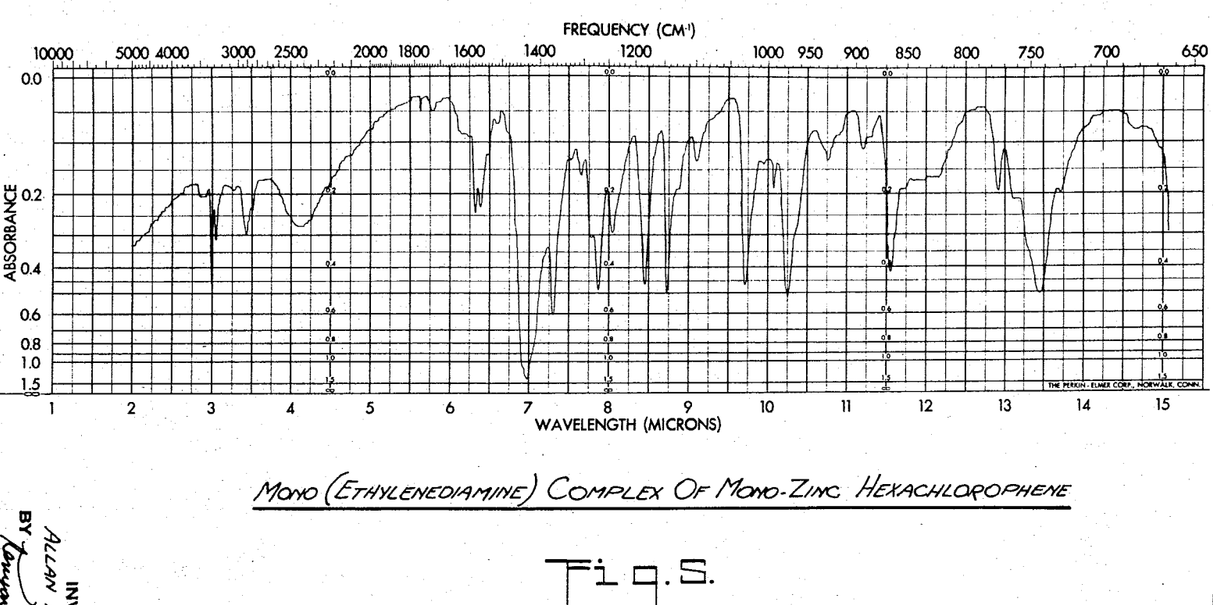

The mono(ethylenediamine) complex of the monozinc salt of hexachlorophene was prepared as follows:

To a slurry of 16.3 grams (0.04 mole) of hexachlorophene and 1.62 grams (0.02 mole) of zinc oxide in 150 ml. of water was added 1.2 grams (0.02 mole) of ethylenediamine at 25° C. The mixture was heated and stirred for two hours at 95° C., then cooled to 10° C. and the solids filtered, washed with water, and dried at 55° C. to yield 18.7 grams (99.8% of theoretical) of white solids melting at 240–270° C. (with decomposition). The infrared spectrum of the complex so prepared is shown as FIGURE 5.

Example XI

Figure 6:
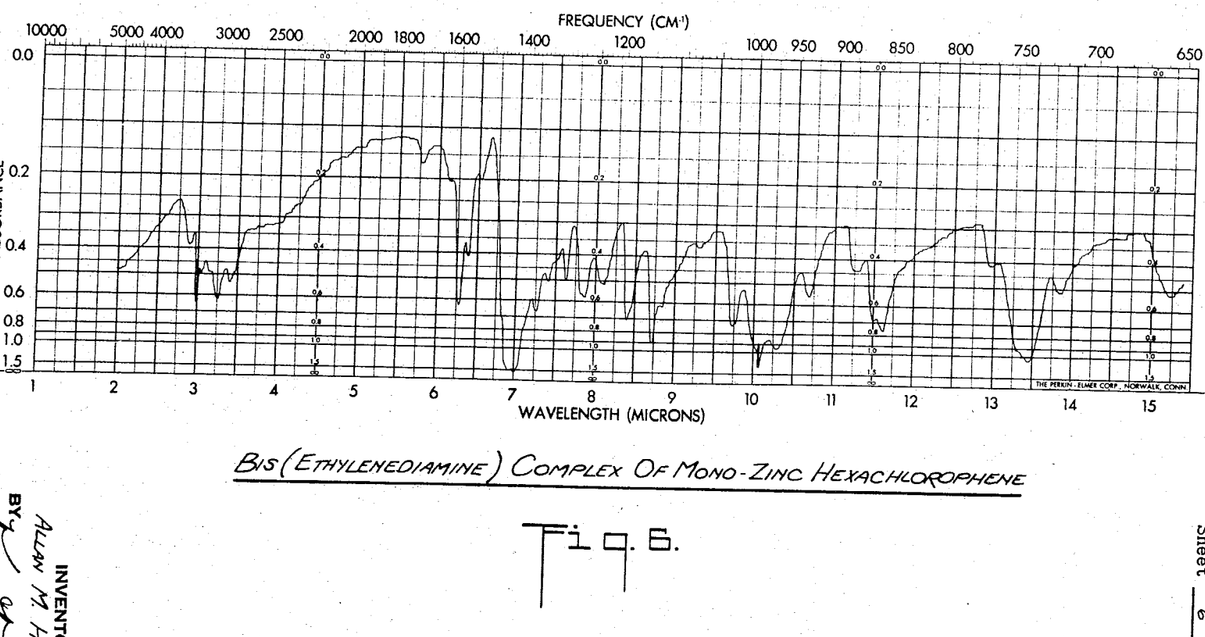

The experiment of Example X was repeated, except that 2.4 grams (0.04 mole) of ethylenediamine was employed, to produce 19.7 grams (98.8% of theoretical) of the bis(ethylenediamine) complex of the mono-zinc salt of hexachlorophene as a white solid melting at 230–250° C. The infrared spectrum of the complex so prepared is shown as FIGURE 6.

Example XII

Figure 7:
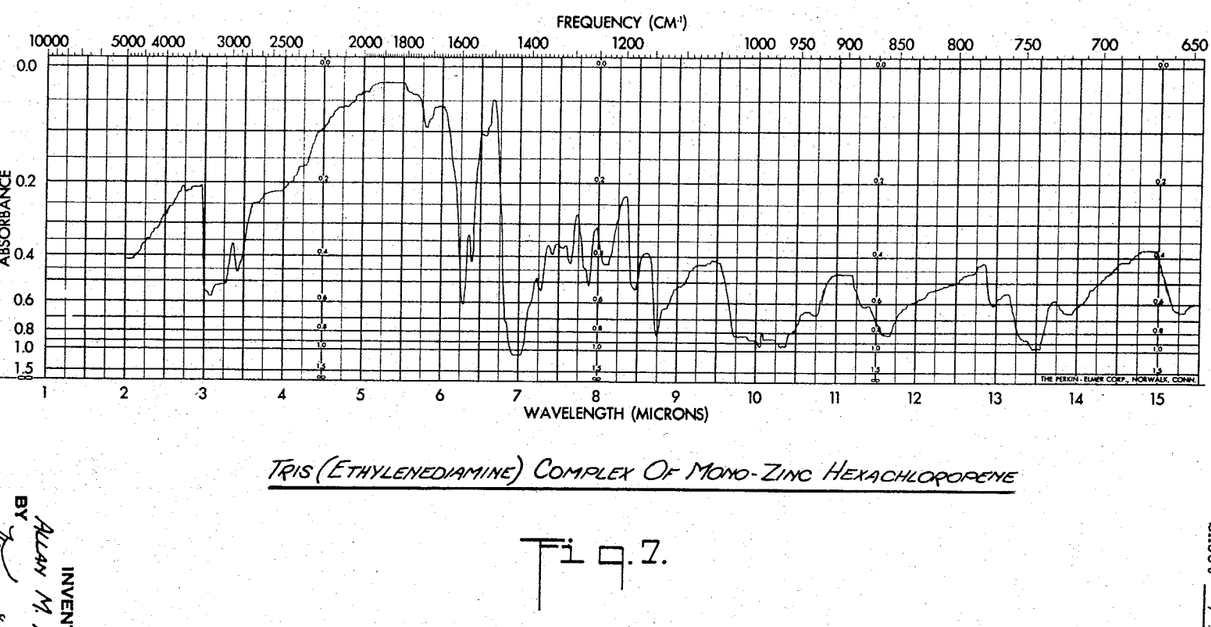

The experiment of Example X was repeated, except that 3.6 grams (0.06 mole) of ethylenediamine was employed, to produce 20.3 grams (96.0% of theoretical) of the tris(ethylenediamine) complex of the mono-zinc salt of hexachlorophene as a white solid melting at 230–235° C. The infrared spectrum of the complex so prepared is shown in FIGURE 7.

Example XIII

Figure 8:
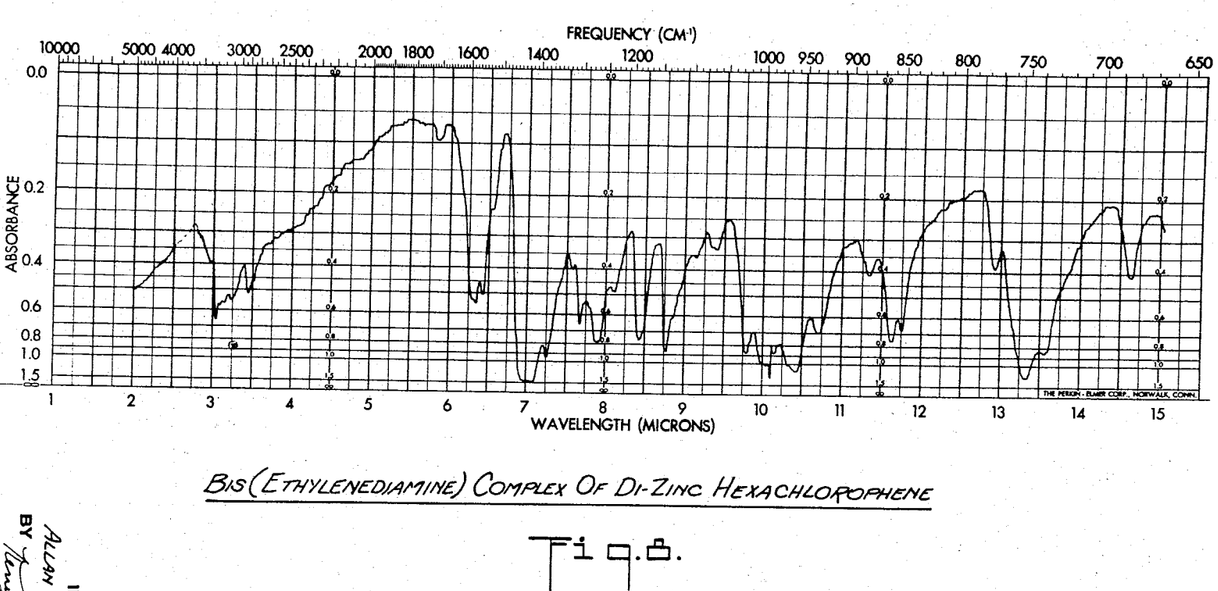
Figure 9:
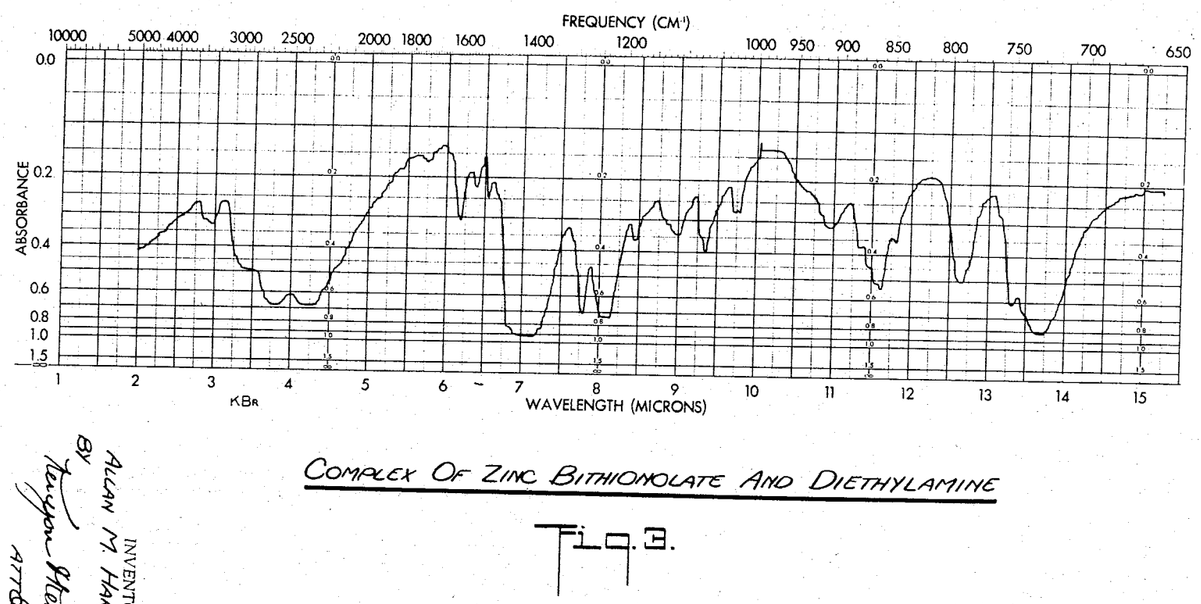

The bis(ethylenediamine) complex of the di-zinc salt of hexachlorophene was prepared as follows:

To a slurry of 16.3 grams (0.04 mole) of hexachlorophene and 3.25 grams (0.04 mole) of zinc oxide in 150 ml. of water was added 4.8 grams (0.08 mole) of ethylenediamine at 25° C. The mixture was heated and stirred for 2 hours at 95° C., then cooled to 10° C. and the solids filtered, washed and dried at 55° C. A yield of 21.2 grams (95% of theoretical) of white solids melting at 300–320° C. (with decomposition) was obtained. The infrared spectrum of the complex so prepared is shown as FIGURE 8.

Example XIV

The mono(ethylenediamine) complex of the monozinc salt of 2,2'-methylenebis(4-chlorophenol) was prepared as follows:

A slurry of 10.8 grams (0.04 mole) of 2,2'-methylenebis(4-chlorophenol), 1.62 grams (0.02 mole) of zinc oxide, and 1.2 grams (0.02 mole) of ethylenediamine in 60 ml. of water was heated at reflux temperature and stirred for two hours. After cooling to 10° C., the solids were filtered, washed with water, and dried at 50° C. A yield of 13.5 grams (98% of theoretical) of light tan solids melting at 118–125° C. was obtained. The complex showed characteristic infrared absorption at 9.97 and 12.35$\mu$.

Example XV

Employing procedures similar to those described in Example IX, except that pyridine was substituted for piperidine, there was produced the mono-pyridine complex of the di-zinc bithionolate.

The amine complexes of this invention have been found to be useful as bactericidally-effective agents in fabric softeners. (Fabric softeners heretofore known comprise an aqueous solution of a surfactant, generally a surfactant of the cationic type, such as quaternary ammonium salts, amido-amines, or imidazolines; see, for instance, the articles by DuBrow et al. in Soap Chemical Specialties, 33 (4) pp. 89 et seq. (April 1957) and by E. G. Weierich in Detergent Age, 1, 36–37, 82–84 (June 1964). The aqueous solvent for the fabric softener may comprise water alone, or a mixture of water and another solvent, such as water-alcohol or water-acetone mixtures, or oil-in-water emulsions). Only minor amounts, in the range of about 0.1 to 5 weight percent, desirably in the range of about 0.5 to 2 percent, of the amine complexes are necessary to impart bactericidal characteristics to the fabric softener. It should be remembered, however, that physically the fabric softeners are greatly diluted in use, often by 100- or 1000-fold, because only a very small amount is added to laundry rinse water. Because of such dilution, the concentration of the amine complexes in the rinse water will be much lower than in the fabric softener, and more on the order of 10 to 100 parts per million of rinse water. The sanitizing effectiveness of the complexes with fabric softeners is surprising, inasmuch as zinc bithionolate itself is bacteriologically ineffective at such low concentrations.

An additional use of the amine complexes is as substantive bacteriostats in toilet soap used for personal hygiene.

Example XVI

Basic screening tests demonstrated that the amine complexes of this invention effectively inhibit the growth of the fungus, *Aspergillus niger*, and three common bacteria, *Bacillus subtilis, Staphylococcus aureus*, and *Salmonella typhosa*. The Agar Incorporation method was used for the fungus, and the Zone of Inhibition method for the bacteria. The results of these tests are set forth in Table I.

TABLE I.—BASIC SCREENING TESTS

| Complex | Minimum Concentration for Inhibition of Growth, p.p.m. | | | |
|---|---|---|---|---|
| | A. niger | B. subtilis | S. aureus | S. typhosa |
| Example No.: | | | | |
| I | 100 | 5 | 5 | 10 |
| IV | 10 | 10 | 20 | 50 |
| V | 10 | 10 | 100 | 20 |
| VI | 10 | 20 | 20 | 50 |
| VII | 10 | 20 | 50 | 50 |
| VIII | 50 | 20 | 10 | 50 |
| IX | >1,000 | 5 | 5 | 5 |
| XII | 50 | 0.5 | 5 | 5 |
| XIII | 50 | 1 | 5 | 5 |
| XIV | 300 | 50 | 20 | 10 |
| XV | >1,000 | 20 | 10 | 20 |

Example XVII

The novel germicides of the invention were incorporated at the one per cent level into ribbons of "Ivory" brand soap (a neutral, white, high grade toilet soap consisting of 80% sodium soap and 20% potassium soap produced from a 70% tallow and 30% coconut oil glyceride blend and made in accordance with U.S. Patent No. 2,295,594) and compressed into plugs which were tested for antibacterial activity against *B. subtilis, S. aureus* and *S. typhosa* by the Zone of Inhibition test. Substantivity of the germicides to the skin was determined by soaking untanned calf-skin "buttons" in an 8% aqueous suspension of the test soap, rinsing three times in fresh portions of distilled water, then placing the buttons on seeded agar plates and proceeding as in the Zone of Inhibition test described in U.S. Patent No. 2,977,316. The results of these tests are summarized in Table II.

TABLE II.—ACTIVITY OF COMPLEXES AT 1% IN SOAP

| Complex | Diameter of Zone of Inhibition, mm. | | | | | |
|---|---|---|---|---|---|---|
| | Antibacterial Activity | | | Hide Substantivity | | |
| | B. subtilis | S. aureus | S. typhosa | B. subtilis | S. aureus | S. typhosa |
| Example No.: | | | | | | |
| I | 10 | 11 | 14 | 0 | 0 | 0 |
| IV | 8 | 12 | 8 | 0 | 0 | 0 |
| V | 12 | 12 | 12 | 0 | 0 | 0 |
| VI | 13 | 8 | 12 | 2 | 4 | 0 |
| VII | 14 | 18 | 12 | 2 | 2 | 0 |
| VIII | 13 | 12 | 12 | 0 | 0 | 0 |
| IX | 15 | 10.5 | 10 | 2.5 | 0 | 0 |
| XII | 8 | 10 | 6 | 8 | 7 | 3 |
| XIII | 10 | 8 | 4 | 6 | 8 | 2 |
| XIV* | 6 | 3 | 4 | 0 | 0 | 0 |
| XV | 12.5 | 11 | 12 | 2 | 1 | 0 |

*At 2% concentration.

These data show that the amine complexes of this invention are bacteriologically active in the presence of conventional toilet soap. Also, several of the complexes, especially the ethylenediamine complexes of the zinc salts of hexachlorophene have significant substantivity. The complexes have little effect on the physical properties of the soap.

Example XVIII

Tests of the bacteriostatic activity of the ethylenediamine complex of zinc bithionolate in a commercial laundry fabric softener were made. A 1:400 dilution in water (simulating a final rinse) was made of "Downy" brand laundry fabric softener (a product of Procter and Gamble Company containing a quaternary ammonium type surfactant) and 2% by weight, based on the weight of the fabric softener, of ethylenediamine-zinc bithionolate complex was added. A comparative test was made using 2% by weight, based on the weight of the fabric softener, of zinc bithionolate. Circles of diaper cloth 1⅞₆ inches in diameter were pre-soaked in tap water and run through a wringer to remove excess moisture. A modification of the AATCC 100–1061 T test was used to determine the bacteriostatic efficacy of each fabric treatment. An inoculum of the test organism, *Staphylococcus aureus*, was prepared by diluting 1 ml. of an 18-hour nutrient broth culture of *S. aureus* with sufficient AATCC Bacteriostasis Broth to provide a cell count between 200,000 and 400,000 per milliliter. Five circles of fabric, all of which had received the same treatment, were placed in a 4-ounce glass jar and sterilized in the autoclave for 20 minutes under 15 pounds pressure. The inoculum was carefully padded onto each circle of fabric at the rate of 0.1 ml. per circle or 0.5 ml. per jar, making sure that there was no runoff. The inoculated samples were incubated in the jars at 98°±2° F. for 18 hours, then 99 ml. of sterile water from a blank were added to each jar and shaken 25 times through a 15-inch arc. This liquid served as the 1:100 dilution in performing serial plate dilutions on Plate Count Agar. Cell count of the inoculum was determined immediately following inoculation of the cloth samples. Using cell counts of replicated tests, the difference between original inoculum counts and counts on treated fabrics was determined and the per cent reduction of bacteria was calculated.

Similar bacteria reduction tests were performed on fabrics treated with 1:400 dilutions of such fabric softener containing lower concentrations of ethylenediamine-zinc bithionolate complex to determine the lower limit of the effective range of concentration. The results of these tests are set forth in Table III.

TABLE III.—REDUCTION OF *S. AUREUS* BY VARIOUS CONCENTRATIONS IN FABRIC SOFTENER OF ZINC BITHIONOLATE AND THE ETHYLENEDIAMINE COMPLEX THEREOF

| Bithionol Derivative | Conc'n. in Fabric Softener, wt. percent | Reduction of Bacteria, percent |
|---|---|---|
| Zinc bithionolate | 2 | 0 |
| Ethylenediamine-zinc bithionolate complex | 2 | 99.9 |
| Do | 1 | 99.94 |
| Do | 0.5 | 99.87 |
| Do | 0.25 | 45.83 |
| Do | 0.1 | 0 |
| Do | 0 | 0 |

It is to be especially noted that the effective concentration is extremely low: a 1:400 dilution means that fabric softener itself is present at 2500 p.p.m. in the rinse water and 0.5% of that is 12.5 p.p.m. for the amine-zinc bithionolate complex.

Although other tests showed that ethylenediamine-zinc bithionolate complex is sometimes 99+% effective at 0.25%, based on the weight of the fabric softener, the 0.5% concentration is always effective in reducing bacteria to practically zero on treated fabric, and it has also been shown to be just as effective on duck as on diaper fabric. The bacteriostatic effect is retained even after the fabric is subjected to ironing.

Experiments in which the zinc bithionolate-ethylenediamine complex was added at 2% concentration to full strength fabric softener and then aged for 14 days at 125° F. showed that the complex has no effect on the color, odor and stability characteristics or homogeneity of the fabric softener after aging. This was in marked contrast to a wide variety of other bacteriostats.

Thus, a new class of compounds, the amine complexes of zinc bisphenol salts, has been discovered. The preparation of a number of species has been demonstrated. Their properties as bactericides and fungicides are advantageously utilized by incorporating minor but bacteriologically effective amounts of them in such well known household cleansing materials such as toilet soap and fabric softeners. This permits and encourages their use in maintaining satisfactory sanitation because no additional procedures or processing steps are necessary for their use, and because any incremental cost of such materials on account of the use of such complexes is slight.

Having thus described the invention, what is claimed is:
1. A bactericidally-active complex of
   (a) a zinc salt of a bisphenol of the formula:

wherein A is thio or methylene and $x$ is an integer having a value of from 0 to 3; and
   (b) a primary, secondary or tertiary mono or polyamine, said amine containing no more than 40 carbons and 4 nitrogens, there being no more than one heterocyclic nitrogen which, if present, is in a 6-membered heterocyclic ring system having no more than two 6-membered rings.

2. A complex according to claim 1 wherein said amine contains no more than 12 carbons and 2 nitrogens, and $x$ is an integer having a value of 1 or 2.

3. A complex according to claim 2 wherein said amine is represented by the formula:

wherein $y$ is an integer having a value of 0 or 1; each of R, $R^1$, $R^2$ and $R^3$, when taken alone, is hydrogen or a hydrocarbyl radical free of aliphatic unsaturation, with the proviso that when $y$ is 0, R is hydrocarbyl; and $R^4$ is a hydrocarbylene radical free of aliphatic unsaturation; and the gram atomic ratio of nitrogen to zinc is at least 2:1.

4. A complex according to claim 2 wherein said amine is represented by the formula:

wherein $z$ is an integer having a value of 0 or 1; $R^5$ is hydrogen or lower alkyl; and $R^6$ is a hydrocarbon radical which, when taken with N forms a six-membered heterocyclic saturated or unsaturated ring system.

5. A complex according to claim 3 wherein said zinc salt is a di-zinc salt of a 2,2'-thiobisphenol and the gram atomic ratio of nitrogen to zinc is 2:1.

6. A complex according to claim 5 wherein said zinc salt is di-zinc bithionol.

7. A complex according to claim 6 wherein said amine is ethylenediamine.

8. A complex according to claim 6 wherein said amine is dimethylamine.

9. A complex according to claim 6 wherein said amine is diethylamine.

10. A complex according to claim 6 wherein said amine is propanediamine.

11. A complex according to claim 6 wherein said amine is hexanediamine.

12. A complex according to claim 6 wherein said amine is triethylamine.

13. A complex according to claim 4 wherein said zinc salt is a di-zinc salt of a 2,2'-thiobisphenol and the gram atomic ratio of nitrogen to zinc is 1:1.

14. A complex according to claim 13 wherein said zinc salt is di-zinc bithionol.

15. A complex according to claim 14 wherein said amine is piperidine.

16. A complex according to claim 14 wherein said amine is pyridine.

17. A complex according to claim 14 wherein said amine is quinoline.

18. A complex according to claim 3 wherein said zinc salt is a mono-zinc salt of a 2,2'-methylenebisphenol.

19. A complex according to claim 18 wherein said zinc salt is the mono-zinc salt of hexachlorophene.

20. A complex according to claim 19 wherein said amine is ethylenediamine.

21. The mono(ethylenediamine) complex of the mono-zinc salt of hexachlorophene according to claim 20.

22. The bis(ethylenediamine) complex of the mono-zinc salt of hexachlorophene according to claim 20.

23. The tris(ethylenediamine) complex of the mono-zinc salt of hexachlorophene according to claim 20.

24. A complex according to claim 18 wherein said zinc salt is the di-zinc salt of hexachlorophene.

25. A complex according to claim 24 wherein said amine is ethylenediamine.

26. The bis(ethylenediamine) complex of the di-zinc salt of hexachlorophene according to claim 25.

(References on following page)

References Cited

UNITED STATES PATENTS

| | | | |
|---|---|---|---|
| 2,608,556 | 8/1952 | Kalberg | 260—270 |
| 2,630,419 | 3/1953 | Wakefield et al. | 260—429.9 XR |
| 2,783,279 | 2/1957 | Chiddix | 260—429.9 XR |
| 3,046,289 | 7/1962 | Clark | 260—429.9 |
| 3,058,948 | 10/1962 | Mosimann et al. | 260—429.9 XR |
| 3,200,135 | 8/1965 | Cutler | 260—270 XR |
| 3,215,717 | 11/1965 | Foster | 260—270 XR |

TOBIAS E. LEVOW, *Primary Examiner.*

H. M. S. SNEED, *Assistant Examiner.*

U.S. Cl. X.R.

21—58; 252—8.8, 107; 260—429.9; 424—999

UNITED STATES PATENT OFFICE
CERTIFICATE OF CORRECTION

Patent No. 3,426,024                                          February 4, 1969

Allan M. Harvey

It is certified that error appears in the above identified patent and that said Letters Patent are hereby corrected as shown below:

In the heading to the printed specification, after line 3, insert -- AND METHYLENEBISPHENOLS --. Column 2, line 54, "monoor" should read -- mono- or --. Column 6, line 24, "10.95" should read -- 10.95μ --. Column 9, lines 60 to 65, the lower left-hand portion of the formula reading should read (SEAL)         Signed and sealed this 30th of June 1970.

Attest:

Edward M. Fletcher, Jr.                        WILLIAM E. SCHUYLER, JR.

Attesting Officer                                           Commissioner of Patents